United States Patent [19]

Jednacz et al.

[11] Patent Number: 5,726,644

[45] Date of Patent: Mar. 10, 1998

[54] LIGHTING CONTROL SYSTEM WITH PACKET HOPPING COMMUNICATION

[75] Inventors: Thomas E. Jednacz, Rancho Pallace Verdes; Yongping Xia, Torrance, both of Calif.; Srinagesh Satyanarayana, Tarrytown, N.Y.

[73] Assignee: Philips Electronics North America Corporation, New York, N.Y.

[21] Appl. No.: 498,715

[22] Filed: Jun. 30, 1995

[51] Int. Cl.$^6$ ...................................................... H04Q 7/00
[52] U.S. Cl. .................. 340/825.52; 340/825.06; 315/294
[58] Field of Search .............. 340/825.064, 825.37, 340/825.52, 825.57, 825.58; 315/294, 295, 323; 307/29, 39

[56] References Cited

U.S. PATENT DOCUMENTS

| | | | |
|---|---|---|---|
| 4,755,792 | 7/1988 | Pezzolo et al. | 340/825.06 |
| 4,847,281 | 7/1989 | Brown, III et al. | 340/825.06 |
| 5,046,066 | 9/1991 | Messenger | 340/825.06 |
| 5,066,896 | 11/1991 | Bertenshaw et al. | 315/294 |
| 5,086,385 | 2/1992 | Launey et al. | 340/825.37 |
| 5,090,024 | 2/1992 | Vander Mey et al. | 375/1 |
| 5,263,046 | 11/1993 | Vander Mey | 375/1 |
| 5,278,862 | 1/1994 | Vander May | 375/1 |
| 5,359,625 | 10/1994 | Vander Mey et al. | 375/1 |
| 5,385,297 | 1/1995 | Rein et al. | 340/825.06 |
| 5,471,119 | 11/1995 | Ranganath | 315/294 |
| 5,530,322 | 6/1996 | Ference et al. | 315/294 |
| 5,537,104 | 7/1996 | Van Dort et al. | 340/825.52 |
| 5,565,855 | 10/1996 | Knibbe | 340/825.06 |
| 5,572,438 | 11/1996 | Ehlers et al. | 307/39 |

OTHER PUBLICATIONS

F. William Gutzwiller, Control Networks for the Home, Oct. 1983, Machine Design Magazine, vol. 55, No. 24, pp. 109–112.

V.R. Hohman, "900–MHZ Radio Provides Two–Way Path Control & Return", Transmission & Distribution (Jun. 1984) pp. 33–36.

G.W. Kelly, "Sona/ECS a Decentralized Environmental Control System", Proc. IEEE Comp. Soc. Workshop on Computing Aid to the Handicapped, Nov. 4–5, 1982, p. 103.

*Primary Examiner*—Michael Horabik
*Assistant Examiner*—Edward Merz
*Attorney, Agent, or Firm*—Anne E. Barschall; David R. Treacy

[57] ABSTRACT

Building lights are master controlled to reduce power consumption under building master control, or in response to electric utility commands to the building computer. Each lighting wall control unit includes a transceiver which can communicate to at least one neighbor transceiver, thereby forming a distributed communication network extending back to the building computer. The transceivers operate asynchronously with low data rate FSK signals, using carrier frequencies between 900 and 950 MHz. Different communications protocols control packet forwarding and acknowledgement so that messages reach their destination but are not forwarded in endless circles, and so that collisions are minimized.

24 Claims, 8 Drawing Sheets

LIGHTING CONTROL SYSTEM WITH PACKET HOPPING COMMUNICATION

CROSS-REFERENCE TO RELATED APPLICATIONS

This application is related to concurrently filed application, Ser. No. 08/498,286 by Srinagesh Satyanarayana for PACKET HOPPING SYSTEM WITH SLIDING FREQUENCY, AND TRANSCEIVER FOR THE SYSTEM, and concurrently filed application, Ser. No. 08/498,285 by Srinagesh Satyanarayana for TRANSMITTER CONTROL SYSTEM FOR LOW DATA RATE FSK MODULATION.

BACKGROUND OF THE INVENTION

1. Field of the Invention

The invention relates to centralized control of building systems having many devices or elements distributed throughout the building. For example, the invention is applicable to centralized control of artificial lighting systems in buildings where each room or area has an individual local control, or to heating and/or air conditioning systems having many individually controllable heating devices, heat pumps (heating or cooling) or heat exchangers. The invention is also applicable to occupancy-sensing, security, or fire detection systems requiring sensed-data transmission from a multiplicity of sensor locations to a central location, as well as control signals transmitted back to selected locations, and systems for improving energy conservation by providing a combination of individual and central control of lighting levels or temperatures at many or all locations within a building, or permitting temporary reduction of energy consumption on a most effective basis in the event the supply system or utility is overloaded or limited in capacity.

More particularly, in lighting applications this invention relates to methods and apparatus for communication between a building computer and dozens or hundreds of modules which each control one or more lamps or luminaries within a room or area.

For convenience, this specification and the claims refer extensively to a "building" or "building computer." It should be clear that the term "building" should be interpreted as including a portion of a building, or a building complex having two or more structures or portions thereof under common control, and sharing one network; and might be applicable to an amusement park or other outdoor situation.

Other applications not directed at energy conservation might include centralized override of volume or channel settings for an existing hard-wired background music and public address system, and in particular would allow control on a group or zone basis where this had not been provided in the hard-wiring layout.

2. Description of the Prior Art

The need to reduce electric power consumption during emergencies, or as a result of simple excessive demand on an electric power system, has led to increasingly sophisticated solutions and proposals. In the past, when an electric utility needed to reduce consumption, it could only reduce distribution voltages or request (in some cases demand) that users reduce their consumption. However, voltage reduction is undesirable, in part because it reduces the efficiency of many of the devices consuming power, and in part because many of the energy consuming devices respond non-linearly to voltage reduction.

Reduction of power consumption involved two kinds of problems: communication, and actual reduction. The first depended largely on announcements over public radio channels, and telephone calls to operators of large businesses and buildings. The second problem was handled with mixed success. Raising temperature settings or turning off selected air conditioning units reduced this aspect of system power consumption without blocking use of buildings. However, because individual light switches were either "on" or "off," and lighting circuits were not arranged to permit effective reduction of lighting while maintaining safe operations in the buildings, significant reductions in this major aspect of energy use often impaired work output or building usability. Within a building, compliance often required sending maintenance personnel to each switchboard or office to turn off "unnecessary" lighting circuits.

With the development of centralized building computer systems for control of heating, ventilating and air conditioning (HVAC), direct communication between electric power distribution system computers and building computers became a possibility. However, this did little to improve the effectiveness of power consumption for artificial lighting.

At the same time, innovations in the control of individual fluorescent luminaires, and groups of luminaires on the same circuit, have opened the door to dimming artificial lighting levels efficiently without making task performance impossible in the affected areas of rooms or buildings. The Varitron® system is an example of fluorescent lighting control systems which allow highly responsive control in an area large enough to require a number of luminaires, but sufficiently uniform in use or light need so that one control regime provides satisfactory illumination for the entire area. This system provides a remotely controllable ballast in each luminaire, and controls all the ballasts in this area by low frequency amplitude modified signals transmitted over the AC power line from one wall unit. Dimming of luminaire output to a number of discrete levels, such as 110%, 75%, 50%, 25% and 9% of normal, provides sufficient versatility while at the same time simplifying the control signalling and responding functions. Within the area local control may be provided by a user operable infrared based "dimming mouse" and/or an occupancy sensor; and a programmable wall unit can be used to change settings automatically at preselected times of day or days of the week.

Central "on-off" building control of lighting has been possible for many years, through use of low voltage wiring from a central office or computer to operate relays controlling local power circuits. However, this technique does not lend itself well to dimming control, because of the large numbers of conductors which are required to carry signals for different dimmer control relays, and the special adaptation of the individual room lighting controls which is required. Such a system is very difficult to retrofit in an existing building. A further difficulty with this type of system is that correction of wiring failures is often difficult because wiring drawings are inaccurate or non-existent, and tracing these low voltage cables is time consuming and expensive.

A low-power radio control system for receivers up to 75 feet away is described in a paper "SONA/ECS, a decentralized environmental control system (for disabled)" published as part of the Proceeding of the IEEE Computer Society Workshop on Computing to Aid the Handicapped, Nov. 4-5, 1982.

Another system for building control makes use of the existing AC power wiring in the building to carry control signals. So-called "carrier current" systems for impressing a relatively low radio frequency on AC power wiring have been used for telemetering data in power distribution systems, and for "wireless" intercom or music systems, but have been prone to excessive noise. To reduce cost, 900 MHz radio channels for 2-way communication are described in "900 MHz radio provides two-way path for control and return" is described in Transm. and Distribution, vol. 36, no. 6, pp 33–6 for June 1984. This system had the advantage that it was claimed to be installable and maintainable by the utility's own workforce.

Systems using high frequency spread spectrum techniques for distributing control signals are described in U.S. Pat. Nos. 5,090,024, 5,263,046, 5,278,862 and 5,359,625. The last of these approximates a swept frequency waveform in which successive square waves are formed by the chirps of the sequence, and the frequency of the square waves is varied over at least a portion of the sequence. This technique is suggested for use in the 900+ MHz band.

A control system sold under the name Echelon uses microprocessors for control of direct link communication to each of the individual controls of the network over a common channel. This system caters to a wide variety of applications, and can have as much as a 1 Mbit/sec communication capacity. This system uses a communication protocol which specifies a packet structure, handshake commands to set up a communication and acknowledge a communication, certain error correction and recovery, and retransmission after a time delay if a communication is lost. Transmission is possible over various media, such as twisted pair, radiated RF, infrared, or high frequency signals carried on the power line, between the central source and each of the nodes, except where a relay may be provided to a group of nodes. As a result, installation of such a system is expensive and requires considerable development time. The Echelon system can be used in the license-free 49 MHz band when power is less than 1 watt. Especially if an RF signal is transmitted over the power lines, this system employs a spread spectrum encoding to provide noise immunity.

As communications systems have become more sophisticated, various protocols have been developed to improve communication efficiency when it is not practical to have a direct link between source and destination. For example, a routing code can be transmitted with the message, and the entire route is directed by this code. Alternatively, in systems such as the telephone networks, complex algorithms evaluate the available paths to select the one which is optimum at this time. However, such systems require substantial computing power at each network node, and are not practical for an in-building distributed communications system.

SUMMARY OF THE INVENTION

An object of the invention is to provide a central building control system which can supplement or override local control, and which requires little or no addition to a building's fixed wiring.

Another object of the invention is to provide a building control system which has a distributed communication system using low cost building blocks.

Yet another object of the invention is to provide such a system which can easily be installed by electricians without special training.

A further object of the invention is to provide a building lighting control system which is easily installed by retrofitting into an existing building.

Still a further object of the invention is to provide a centralized control system with redundant route capability compensating for unreliability of individual links.

According to the invention a building control system includes individual control units in each of the rooms or areas to be controlled; a central control unit for generating control signals which are directed to a particular one, or a group, or all of the individual control units; and a low power radio transceiver associated with each of the individual control units and with the central control unit, where each of the transceivers transmits sufficient power to communicate with at least one other of the transceivers, but not all of them; and at least some of the transceivers can exercise at least some control over settings of the associated individual control units, overriding at least the prior settings established by local operation of the individual control units. Different levels of priority can be assigned to individual control points, to determine to what extent either the central or local control can override the other. It is clear that the small number of bits needed to transmit dimming information leaves room in a packet, as short as 5 bytes, for extensive priority coding.

According to a preferred embodiment of the invention each transmission by the transceiver associated with the central control unit, which is intended for a particular individual control unit, is a packet of digital information including an address of the transceiver associated with that control unit, and the control signal. Optionally the packet may also include the sender's address, routing or re-transmission information, priority coding, and/or various check bits. Instead of a particular address, the packet may contain a group address, or be coded as an all-network broadcast. The digital information packet may be preceded by a burst of unmodulated carrier signal, and/or a synchronizing signal. These will be selected according to the predictability of the carrier frequency, and the type of modulation, being used, so that receivers can lock on to a transmission before the first information (e.g., address) bit is received.

Each combination of a control unit and transceiver includes circuitry for determining, from address information in a packet received by that transceiver, whether the packet is intended for that transceiver; and if not, whether or not the packet should be retransmitted. If the received packet is addressed solely to that transceiver, in accordance with any control data contained in the packet, the combination will provide an appropriate control signal to the devices in that room or area.

Where a received packet is addressed to at least one other combination, re-transmission decisions are based on routing or re-transmitting decisions; that is, if a route is defined, and this transceiver is an intermediate node along the route, this transceiver will retransmit the packet, whereas if routing is not defined, the decision whether or not to retransmit will be based on some other criterion. In a system according to the invention the route can, for example, be fully defined by the address in the packet, or by the address and routing data in the packet, or by a routing table which is stored in the combination (in this case, probably two tables, one for outgoing packets and one for acknowledgements). If transmission is by "flooding" then examples of retransmission criteria include comparison of the packet with recently transmitted packets, and retransmission codes.

To eliminate need for pre-determining routing paths and to reduce the possibility of collisions, the preferred mode of packet hopping is flooding with hop counts. According to a further aspect of the preferred embodiment, each packet which is transmitted includes a code signal indicative of a maximum number of times that packet should be retransmitted; and prior to retransmitting the packet, a transceiver decrements that code signal. In a still further preferred embodiment of this aspect of the invention, a transceiver/control unit contains a memory for storing a previously retransmitted packet, and a circuit for comparing the latest received packet with that stored packet to determine if a retransmission criterion is met.

According to another aspect of the preferred embodiment, when a transceiver/control unit combination has received a packet for which it is the "destination"(address of combination is the address in the packet) upon providing the appropriate control signal to its control unit, the transceiver will transmit an acknowledgement signal. If flooding is used in both directions, any transceiver receiving the acknowledgement signal will attempt to retransmit the acknowledgement signal. If routing information is transmitted and kept with a packet, then this would be used in the reverse direction for acknowledgement. If a re-transmission limit is used for outgoing packets, then a similar scheme may be used for acknowledgement packets, or acknowledgements may be treated differently.

Where the system being controlled is a building's artificial lighting, the control units may provide local on-off and/or dimming control, and central control of dimming or dimming and on-off, or other combinations. Different priority levels can permit local users greater or lesser control overriding the central control signal. For example, top local priority can permit resetting to any light level by local control; second priority allows two steps of brightness increase but not above 100%; third priority allows one step of increase but not above 100%; and lowest priority allows no increase under local control. Preferably the priority is provided as a code with the central control signal and will vary according to the room or area being controlled, and the circumstance causing the control signal to be transmitted.

Preferably, most or all the transceivers are interchangeable and transmit with approximately the same power level in a frequency band which provides good penetration of structural walls and floors, but without radiating substantially into other buildings or suffering severe interference. This frequency can be any available commercial transmission band which has suitable propagation characteristics. However, it is also advantageous to select a band, such as an "ISM" band, which permits unlicensed operation if the power output is less than a certain figure, such as one watt. A desirable band meeting those qualifications, and for which relatively low cost RF equipment is readily available, is the 900 to 950 MHz band; but other bands such as ISM bands near 49 MHz, 470MHz, and 2.4 and 4.5 GHZ may be considered. In one embodiment, the transceivers are closely regulated for transmitting frequency, to fall with one channel; and the receiver section monitors only that channel. Upon receiving a packet which it should retransmit, the transceiver will wait for a period of time, and will then retransmit in that same channel unless the transceiver detects presence of a carrier signal within that channel. This period of time is preferably obtained from a random number table stored or generated in the transceiver/control unit combination; but the delay may be a selected value pre-assigned to that combination.

In another embodiment, to reduce cost the transmitter frequency is not highly stabilized, especially with respect to temperature. Transmission frequency will fall somewhere within a relatively broad band, rather than in a defined channel. In this embodiment the receiver section is capable of detecting transmission at any frequency within that relatively broad band, and locking on to that frequency to detect the digital signal. Upon receiving a packet which it should retransmit, each transceiver will wait for a period of time, and will then retransmit at whatever in-band frequency its transmitter is then ready to produce, unless the transceiver detects presence of a carrier signal within the frequency band being used for communication. Again, this period of time is preferably obtained from a random number table stored or generated in the transceiver/control unit combination.

Preferably, all the transceivers are interchangeable and transmit with approximately the same power level, using a carrier frequency which is between 900 and 950 MHz; and still more preferably, within a nominal band approximately 10 MHz wide, such as approximately 905 to 915 MHz. If transmission is controlled to fall within one channel, this is preferably a channel of approximately 30 kHz bandwidth.

Further, according to the invention a method of controlling at least one parameter at a plurality of control points distributed throughout at least a portion of a building includes the following steps:

transmitting a first radio signal, having a first power level sufficient to be received reliably at least one of the control points, and insufficient to be received reliably at all control points within the building, from a transceiver associated with a central control point, modulating the first radio signal with a packet of digital information including address information relating to at least a second control point, and a control signal relating to the controllable parameter for all control points defined by that address information, receiving the first radio signal at the one of the control points, transmitting a second radio signal, having a second power level sufficient to be received reliably at another of the control points, and insufficient to be received reliably at all control points within the building, from that one of the control points, modulating the second radio signal with a packet of digital information including address information relating to at least the second control point, and the control signal, continuing reception and retransmission of packets containing address information and the control signal until the second control point is reached, and upon receipt of the packet at the second control point, controlling the parameter according to the control signal.

In a preferred embodiment, when a control signal relates to all the control points in the building, the address information includes an "all network" address or code, and the method further includes controlling the at least one parameter at the one of the control points, according to the control signal, retransmitting a packet containing that control signal from successive control points until all control points have received one of these packets, and controlling the at least one parameter at each of the control points.

In still another preferred embodiment the first and second radio signals are transmitted in a same frequency band, and the method further includes:

after receiving the first radio signal, testing at said one of the lighting control point, to determine if a further radio signal at some carrier frequency is being received in that same frequency band, and transmitting said second radio signal only after determination that no radio signal at approximately the same carrier frequency is being received. According to another aspect of this embodiment, before testing to determine if the band is clear, the method includes waiting either a predetermined period of time assigned to that transceiver, or a period of time randomly determined by that transceiver.

A further feature of the invention, especially valuable at the time of initial installation, provides a method of automatically determining usable communication links between the different control points. This method uses unique identification codes which are (preferably) installed in each transceiver by the manufacturer, and which are recorded on installation sheets or drawings when the transceiver/control unit combinations are physically installed; and acknowledgement signals which are transmitted from a control point whenever it receives a packet which is addressed to it or a group of which it is a member, the whole network. To achieve automatic network evaluation, the building computer transmits signals successively to each of the nodes, to cause them to transmit test packets. From the patterns of acknowledgement signals received the computer can generate displays or printouts showing the useable links and the locations of the nodes in the building.

The ability to automatically determine usable links, and from this to determine the number of hops which should be required to reach any particular node, provides the additional benefit that a change in the physical location of the building computer, or apparently minor building renovations which affect one or more links, can be accommodated easily. The initial installation method can be repeated, so as to re-define the system, with very little cost in operator time.

One of many applications of the above-described method embodiments is for controlling lighting levels within a building having a plurality of lighting control points. In this application, the control points are lighting control points from which lights in an area or room can be dimmed or turned on and off; and the parameter is a lighting level (e.g., off, dimmed to some level, or normal on). This method further includes controlling at least a first luminaire from the one of the lighting control points which receives the first radio signal, independent of that first radio signal.

In a preferred embodiment, when a lighting control signal relates to all the control points in the building, the method further includes controlling at least a first luminaire from the one lighting control point, in response to receipt of the first radio signal, and controlling at least one other respective luminaire from each of the other lighting control points, in response to receipt of one of the radio signals.

It will be clear to those or ordinary skill in the art that all these features provide low cost wireless communication, with a very low cost of installation.

DESCRIPTION OF THE PREFERRED EMBODIMENTS

Figure 1:
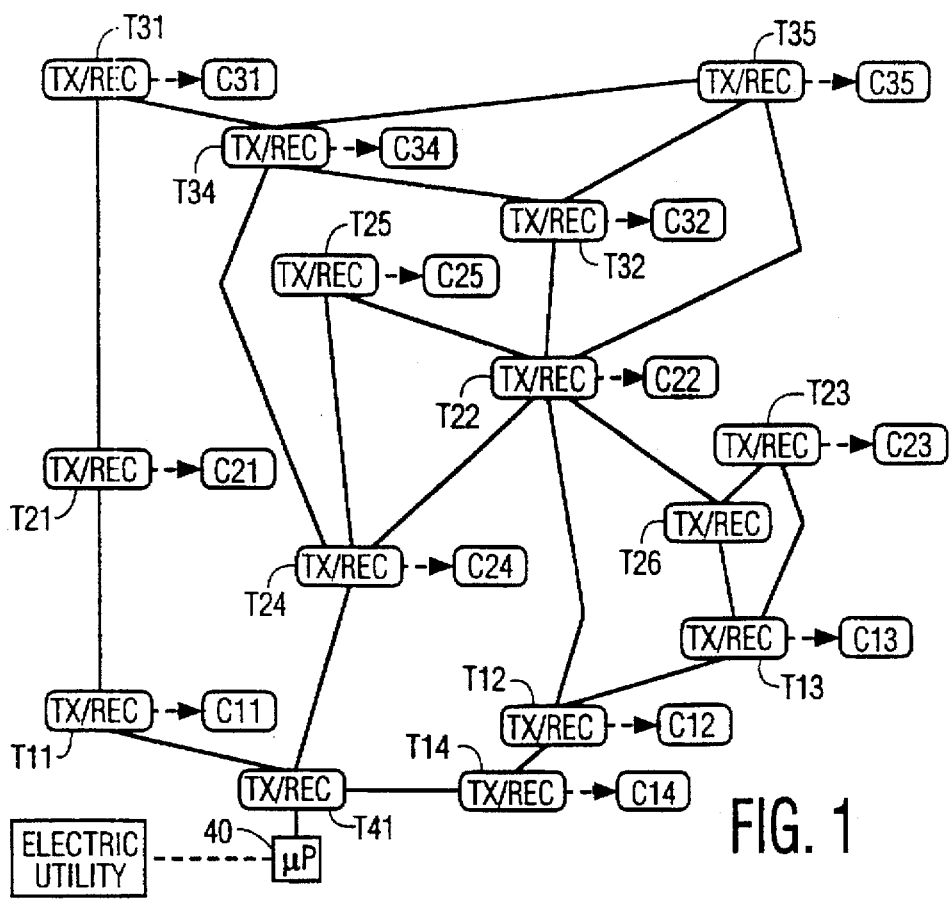
FIG. 1 is a schematic drawing of a system according to the invention, showing communication links which are expected to be functional between different nodes.
Figure 2:
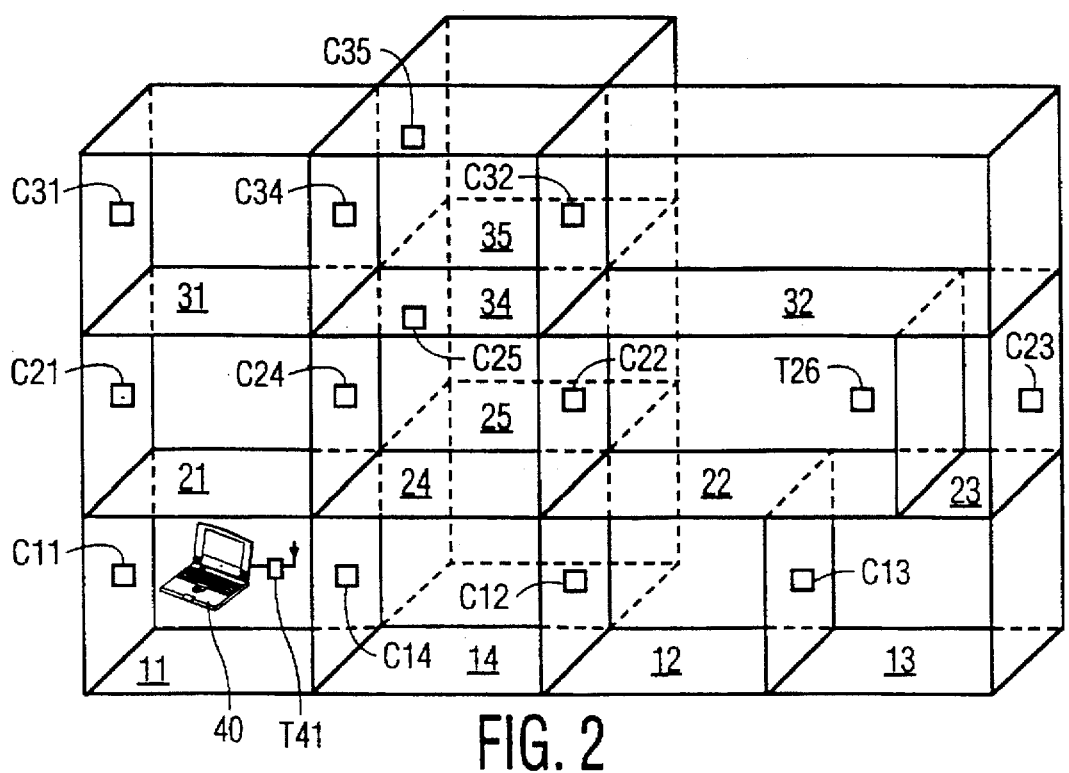
FIG. 2 is a diagrammatic view of a building in which the system of FIG. 1 is used.

The system shown in FIG. 1 demonstrates the principle of the invention as it might be applied to a building shown diagrammatically in FIG. 2, having rooms 11–14, 21–25, and 31, 32, 34 and 35. A number of RF transceivers T11–T14, T21–T26, T31, T32, T34, T35 and T41 form a communications network. All but two of these transceivers have respective associated room lighting controls C11–C14, etc. which control the built-in fluorescent lighting in the respective rooms, and which receive control signals from the transceiver. The transceiver T26 functions as a radio relay and therefore does not have an associated lighting control. The system includes a building computer 40 directly connected to the transceiver 41 which can communicate with the transceiver/control combination T11/C11 for the lights in that room, and preferably at least one or two other transceivers of the network. It will be clear, of course, that the building computer and its associated transceiver do not need to be in the same room (they are usually connected by a cable), and the transceiver T41 can be located anywhere so long as it can reach and be reached by at least one other transceiver.

Almost any small computer will have sufficient processing power and storage capacity for use with the invention. An "application" program will provide procedures for network set-up, normal operation (both automatic and as instructed by building personnel), routine network testing, and any desired interface with other computers or sources of control.

Figure 3:
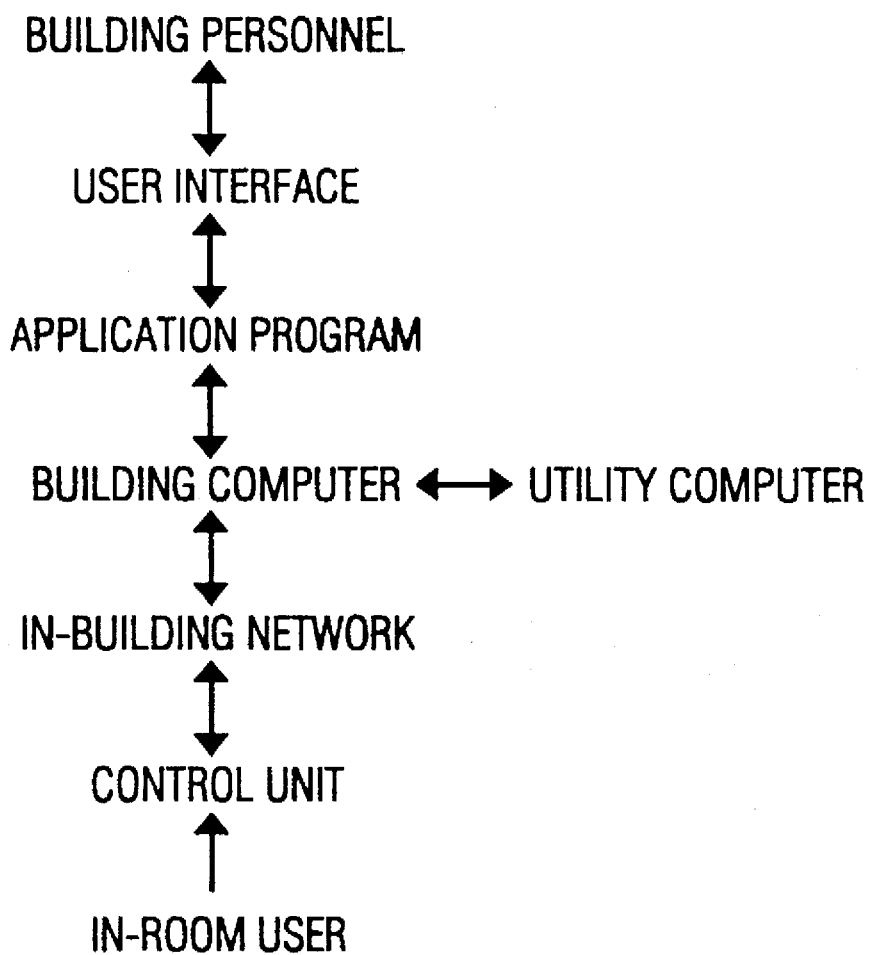
FIG. 3 is a diagram showing the relationship between different levels of control of building lighting.

The different levels of control made possible by the building communication system are shown in FIG. 3. The highest level uses applications programs in computers; these may also be considered as intelligent software modules which reside primarily in a building computer, but may also automatically interact with another computer in, for example, an electric utility serving the building. The second level of control is the building manager, who will have at least some power to modify or override the normal control modes of the building computer. The third level is the communications network itself, because partial failure of, or changes in, this network affect the ability of the higher levels to control room units. The lowest level is user control, which can range from an indefeasible on-off switch (ultimate authority) to a limited permitted variation in the dimming setting of some or all of the luminaires in a room.

To permit use of standard "building blocks" for assembling systems, and avoid the administrative complications of facility licensing, it is preferable to select a transmitter power and carrier frequency for which unlicensed operation is permitted, but which can transmit through at least one interior wall or floor of a building so as to provide reliable communication with at least one other transceiver. It is also desirable to minimize interference (false reception of lighting control signals) by a similar system in adjoining building. In a preferred embodiment of the invention, each of these transceivers operates in the same frequency band, such as the UHF band between 900 and 950 MHz, and preferably the band between approximately 905 and 915 MHz, where pulsed transmission below 1 watt power is permitted. In a building of typical commercial office construction, power levels between 30 and 100 mw, for example, appear desirable. By limiting the duration of each transmission burst to, for example, 100 msec, and observing a waiting interval slightly over 6 seconds, the average transmitted power can be maintained below the equivalent of 460 μw continuous. The paths of reliable communication between transceivers T11–T41 are shown by the interconnection lines in FIG. 1.

To minimize the effect of failure of any one transceiver, the network layout in the building has been designed to provide at least two normally reliable communication links for each room transceiver/control combination. Typical intra-building problems whose resolution is shown by this embodiment include the lobby 14 on the ground floor, which may have special ceiling decorations or features interfering with communication with the room 24 directly above, and the end room 23 which does not have reliable communication directly with combination T22/C22 because of the length and utilization of room 22. This problem is overcome by providing transceiver T26 partway along the length of room 22 to relay messages.

In the system shown, signals normally originate from the building computer 40. This computer will frequently itself be connected via a modem or other network to a power company (electric utility) computer, to provide automatic control in the event of emergency conditions requiring reduction of power consumption in a region. The transceiver T41 transmits signals which are coded either to control a designated one or group of the wall units C11–C35, or all the units.

Another aspect of the invention relates to the control of retransmission by the various transceivers, so that messages will eventually reach their destination, and an effective compromise can be reached between overall system control complexity and confusion due to multiple transmissions of the same message.

Stored Routing Tables

Figure 5:
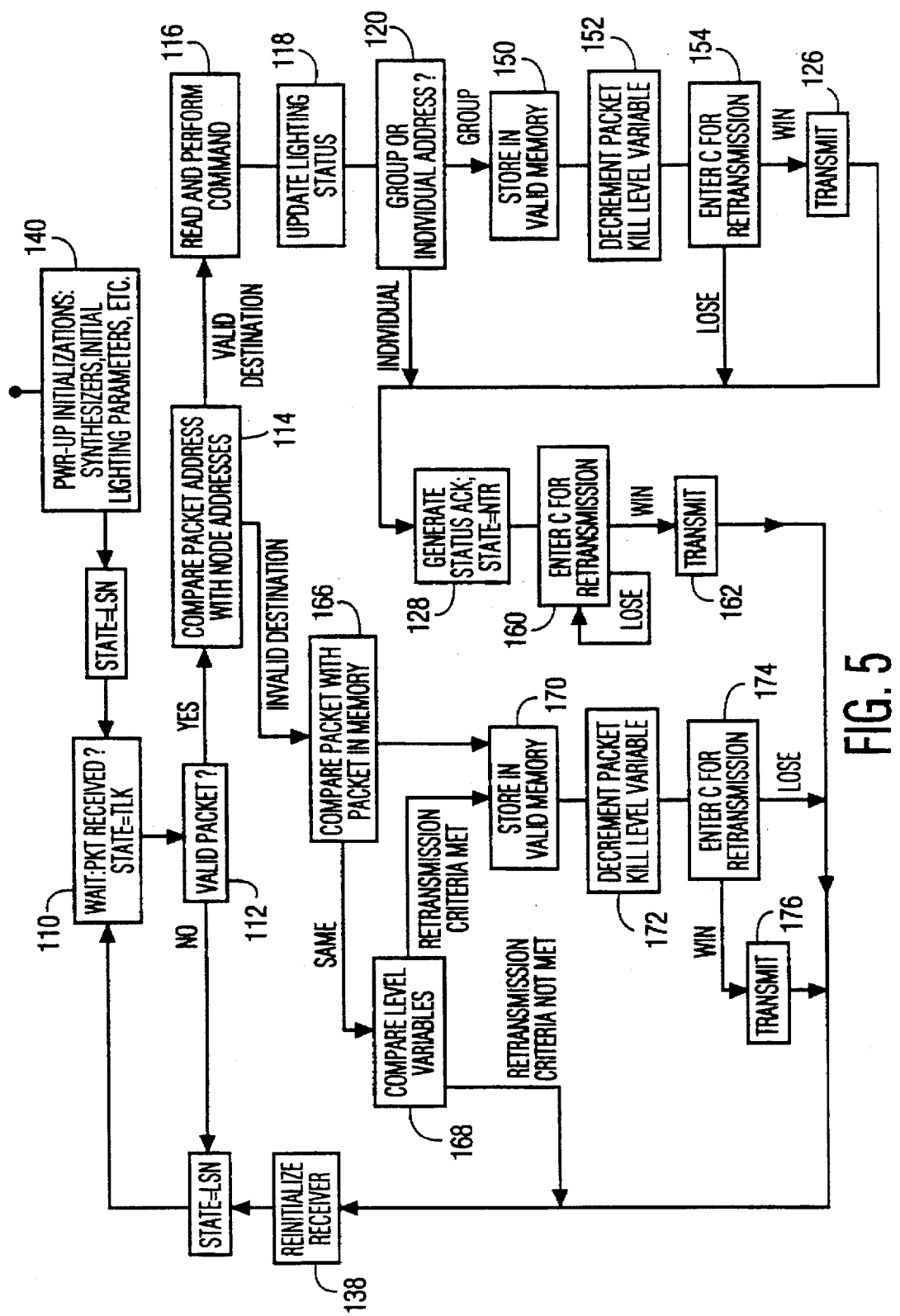
FIG. 5 is a node logic diagram for the system of FIG. 1 communicating by pseudo-random flooding.

The operational scheme shown in FIG. 5 uses a predetermined routing arrangement, with each node operating asynchronously, and retransmitting on a CSMA (Carrier Sense Multiple Access) basis. Each transceiver contains an address table of those nodes (or groups of nodes) for which messages are to be routed through this node. When a message is received at step 110, it is error checked in step 112, and in step 114 the destination address in the packet header is compared to determine if it is directed to this node. If so, in step 116 the control message is decoded and performed, and in step 118 any directed immediate change in lighting is checked.

In step 120 the destination address is again checked, to determine if other nodes should receive the same message. If not, then an acknowledgement control signal is output. If this is a group address, then in step 122 the address table is checked to determine if the message should be retransmitted. If YES, then in step 124 the channel is checked for signals indicating that another transceiver is transmitting, and in step 126 the message is retransmitted as soon as the channel is clear. If the step 120 determination was that the address was an individual address, or in step 122 the group address was determined not to be in the address table (that is, this node is not in the pre-set path to any more remote nodes), or the step 126 transmission has been completed, then in step 128 an acknowledgement signal is generated.

If, contrary to the sequence described above, in step 114 the received packet address is determined not to be this node, then in step 130 the address table is checked to determine if this packet address is listed. If this answer is YES, or step 128 has been completed for a message intended for this node, then steps 134–136 are performed similarly to steps 124–126, thereby transmitting either the message intended for the other node, or the acknowledgment of receipt by this node. After the step 136 transmission, or determination in step 130 that the message is not intended for a more remote node on this pre-set path, then in step 138 the receiver is re-initialized to await any other messages.

Figure 4:
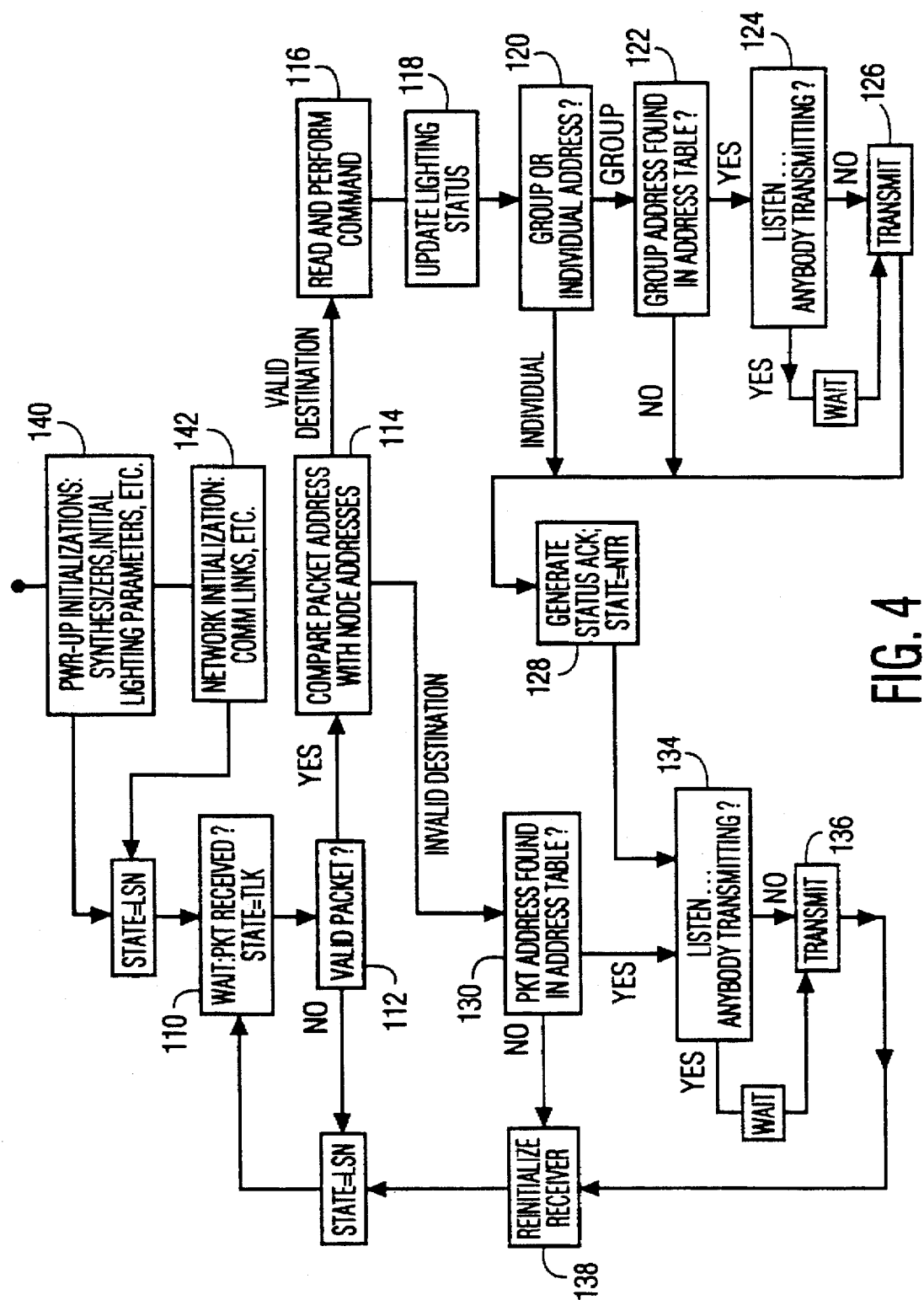
FIG. 4 is a node logic diagram for the system of FIG. 1 communicating over partially pre-planned routing.

The process of FIG. 4 presumes not only that each transceiver or transceiver/control combination has (typically, has been programmed with) a unique node address, but also that address tables for group addresses and node addresses have been provided and loaded. The pre-set routings represented by these address tables can be pre-determined from a study of the building layout, but are subject to required modification in the event of failure of a transceiver near the beginning of a path, or degraded or blocked transmission between two transceivers which are adjacent on the path. Thus, in addition to power-up initialization in step 140, and network initialization in step 142, discussed below, automatic re-configuration of the pre-set routing may be required if repeated failure of the building computer to receive acknowledgement signals from one or more transceivers indicates either a hardware failure or a communication link blockage.

As described above, the FIG. 4 configuration and operating method may increase both costs of hardware and network overhead for initial programming and re-programming within the building computer and at the affected transceivers. In a building having a number of communication links whose reliability changes frequently because of building use dynamics this re-programming could be a serious disadvantage. This can be overcome by providing two or more routing paths to particular combinations, for example by including additional addresses in the tables searched in step 130.

Flooding

An alternative communication method involves "flooding" the building, such that each transceiver repeats received messages without consideration of logical or pre-set routing, unless a received message is addressed solely to that node. However, it is clear that there must be some limitation, or else a message would be endlessly circulated around the network. One form of limitation is to put a date/time cut-off code in the header when it is transmitted from the building computer, and to inhibit re-transmission by any node after that time, and to put a similar cut-off code in the header of acknowledgement messages. However, this method requires that each transceiver/control combination contain a local clock whose time is accurate, at least in comparison with the time for a packet to be retransmitted to its final destination.

Another method of limiting message circulation around the network involves inserting a sequence number in the header, and providing each transceiver with a memory stack which has a pre-set number of locations for storing the most recently received sequence numbers, and re-transmits a message only if its sequence number is not found in the stack. Again, however, this method requires additional memory capacity in the transceiver/control combination.

Flooding with Hop Counts

A method of limiting message circulation, without requiring large local memory capacity, utilizes a kill level variable code placed in the header of each transmitted packet. This technique takes advantage of the fact that the building computer contains data defining the number of relay steps normally required to reach each node in the building, so that it is easy to limit the number of re-transmissions to zero for nodes in direct communication with the building computer's transceiver; to one, for "second tier" nodes, and so on; and to allow one or two extra retransmissions for far-removed nodes where collisions on the most direct route may cause a message to arrive by a slightly longer route. This method also prevents a given node from retransmitting a second time, when it receives a retransmission of a packet from another node after the given node has retransmitted the packet.

The logic diagram of FIG. 5 shows operation of a node when the transmission protocol includes a packet kill level variable. Steps 110-120 are the same as in FIG. 4. After determination in step 120 that the address was a group address, however, in step 150 the packet is stored in a packet memory. This packet header includes a field containing a kill level variable, which is a number that indicates how many times this message may be re-transmitted. In step 151 this field is checked, and if the value is greater than zero, in step 152 the kill level variable is decremented once. In step 154 this modified packet is held while the channel is checked, as in step 124 of FIG. 4.

If the channel is clear, then in step 126 the packet with decremented kill level variable is transmitted. After a predetermined period of time in step 154, if the channel has not become clear the attempt to retransmit is aborted. Following aborting in step 126, or identification of an individual address in step 120, an acknowledgement packet is generated in step 128. Even though aborting means that nodes farther down the group will not receive the packet at this time, if this node waits too long to transmit the acknowledgement signal, then the building computer will repeat the packet to this node as well as well as others.

In step 160 the acknowledgement packet is held while the channel is checked, as in step 134, and in step 162 the acknowledgement signal is transmitted.

If in step 114 a received packet is determined to be addressed to a different node, then in step 166 it is compared to the previously received packet which is most recently stored in the packet memory. This memory may be sized to store only the most recently received packet or, where traffic is high in a large network, the last two or more may be stored for comparison. If the address and data content are the same, then in step 168 the packet kill level variable in the memory is compared with that of the packet just received. If the variable in the just-received packet is the same as or less than the stored value of the variable, and is greater than zero (that is, the just-received packet has arrived here by the same number as, or fewer retransmissions than, the one previously received, so a new repeat packet will be forwarded), or if the comparison in step 166 showed that this message is a different message, then in step 170 this packet is stored in the same memory as used in step 150. In steps 172, 174 and 176 the packet kill level variable is decremented, the resulting packet is put in the one-step queue for transmission if the channel becomes available soon enough, and is transmitted as in steps 152, 154 and 156. After transmission of acknowledgement in step 162 or the other node's packet in step 176, or loss of transmission criteria in step 168 or 174, in step 138 the receiver is re-initialized to await receipt of the next packet.

The node processing of FIG. 5 prevents retransmission of a recently retransmitted packet upon receipt of that same packet as a result of retransmission by a node further removed from the building computer, while at the same time accepting for retransmission a repeat message from the building computer, resulting from failure to receive an acknowledgement signal after a previous attempt to send this packet to another node.

Acknowledgement packets may be handled just like outgoing packets, except that they always will be directed to the building computer. Therefore, instead of providing that address, an acknowledgement code may be used. The combination (which was the destination for the packet originally) can then leave its address in the same location in the packet, and set the kill level variable to a predetermined value stored in that combination's memory.

Partitioned Spanning Tree (PAST)

For a building which is not large, and in which the necessary communication links are reliable, an efficient (in terms of communication resources) routing protocol uses partitioned addresses, which combine a unique address and routing information in one field in the packet. Although the packet length may be increased, for a network where the longest chain is 10 or fewer links, this packet length is acceptable.

Figure 6A:
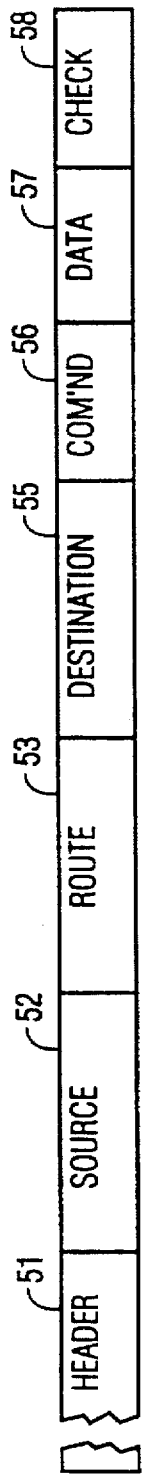
FIGS. 6a–6d are diagrams of packets usable with different operational protocols, the packet of FIG. 6c being adapted for the system of FIG. 5.
Figure 6B:
Figure 6C:
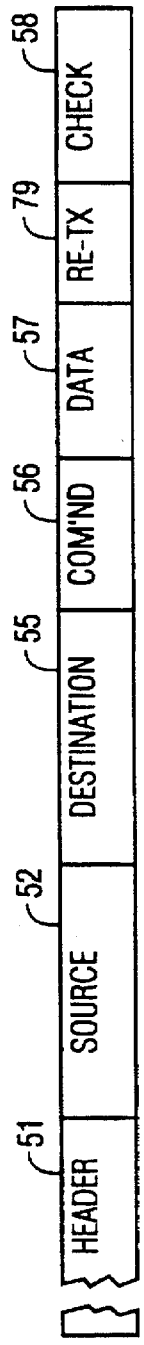
Figure 6D:

The packet format shown in FIG. 6d uses two bit positions to represent one four-level digit of an address. If messages are limited to all-network, and individual node address, then theoretically 255 rooms can be addressed with a 4-digit address using four-level digits, but in practice the realizable number will be much less.

Preferably, at each node few, simple comparisons should be required to determine if a message is to be retransmitted. The PAST format shown uses one digit to identify the first level nodes (e.g., 1000); the next digit to identify nodes reached through that first level node (1200 is the second node reachable through node 1000); and so on. An address of 0000 is recognized as an "all-network" message and is retransmitted by all but the last-level nodes.

According to this protocol, at first level node 1000 any address having the first digit =1, and at least one other digit unequal to 0, should be retransmitted. Second level node 1200 will retransmit addresses starting with 12, and having either later digit unequal to zero; and so on. This routing scheme greatly simplifies the logic and memory requirements at the various nodes; but 2-bit digits limits the tree to 3 nodes at each level of branching, except for the last level which can accommodate 4 nodes for each of the 9 third level nodes. Thus, if the farthest rooms can be reached in 4 hops, and the starting point is near the center, a total of 147 rooms could theoretically be addressed uniquely. However, it is unlikely that signal propagation in a building will be that favorable, so that many of the addresses would be unusable.

In the system just described, an address of 0000 is a network-wide broadcast. However, no use is made of addresses 0001 through 0333. A more efficient operation can use a leading bit to distinguish between a network-wide broadcast and an acknowledgement signal. With this addressing scheme, more of the following bits are available for addresses; if "1" means acknowledgement, then the following bits will be used for the address of the node. This arrangement enables a node receiving such an acknowledgement packet to retransmit only if it comes from a node farther out on the same branch of the tree, and thereby inhibit multiple retransmissions of the same acknowledgement signal by different nodes at the same level.

One problem which is not readily overcome is that of collisions between acknowledgement signals following a network-wide broadcast. In particular, all nodes have identical transceivers and microprocessor capabilities. None of these include storage of packets in a queue for retransmission. Therefore, if two nodes transmit, in rapid but non-colliding succession to the same higher level (closer to the building computer) node in the tree, it is likely that the higher level node will not yet have retransmitted the first of these acknowledgement packets, and one will become lost. This cannot be resolved easily by setting staggered delays in transmission of acknowledgement of a network-wide broadcast, where these delays are simply related to the node address, because certain nodes will receive strong signals from nodes which are in other branches, and are capable of preventing accurate detection of signals from nodes in the same branch.

Increasing the length of the address, by increasing the number of levels or increasing the number of bits per digit, allows use of this scheme for buildings with a large number of rooms. However, in the event that one of the communication links becomes unreliable, reconfiguration of the routing can be very difficult.

Signal and Data Format

For reasons to be discussed below, the carrier frequency is very high compared to the relatively small amounts of data required for building control. A very low data rate such as 4800 baud will suffice. One proposed format and transmission plan involves a transmission cycle of approximately 200 msec; that is, the building computer will wait that long to receive an acknowledgement signal. Failure to receive acknowledgement within that time period is considered proof of failure, so that the message will be resent.

Alternatively, when the farthest nodes will require many hops to be reached, the building computer may base the time before re-sending of a message on the number of hops required for the round trip, plus allowance for some waiting time before each of the re-transmissions.

A packet may consist of 20 8-bit bytes transmitted at a 20 Kbit/sec bit rate, preceded by an unmodulated carrier burst or preamble lasting perhaps 12 msec. This corresponds to a total transmission duration of 20 msec. At least the first two bytes will be allocated to address and/or other data, including routing information, which will identify a single room control, or a group, or all controls, to which the message is directed. Only 3 bits are required for lighting brightness (dimming) information. Additional bits will be allocated for check bits, and acknowledgement or other system command information.

The different packet formats shown in FIGS. 6a–6d are not drawn to accurate time scale. The length of one block is not necessarily one byte, or an integral fraction of or number of bytes. Blocks which, for a given size building and control arrangements, may be identical, have the same reference numeral.

Direct Routing

Perhaps the least sophisticated technique, because it increases packet length the most, is to transmit a complete routing path as part of each outgoing packet. This has the advantage of simplicity in processing at each node; however, in a medium large building having unique addresses for each node, eight to twelve bytes may easily be required.

As shown in FIG. 6a, a packet 50 starts with a header or preamble 51, which may be unmodulated or contain synchronization or other bit modulation to simplify identification of the packet as valid for this network. The header or preamble will have a length determined by the relative difficulty (amount of time required) for a receiver to lock on to the transmission, for decoding and acting on it. The first information block 52 is the address of the node or transceiver which originated the packet; for outgoing packets this would be the address of the transceiver T41 connected to the building computer. The next block is the route block 53, which contains information describing the route to be followed between the source and the destination. The route block 53 may be as short as one address, as shown, when the destination is a second-tier transceiver; many bytes in length if the destination can be reached only after many retransmissions; and will be omitted if the destination is a first-tier transceiver; or may be coded in some fashion to reduce packet length in a large building.

In the format of FIG. 6a the fourth block is the destination block 55, which is the address of the combination for which the packet's control data is intended. The address can be completely arbitrary, or can contain portions identifying the building (useful if adjacent building interference is a recognized problem) as well as addresses within groups. This is followed by a command block 56, which may contain various kinds of network information or packet description, such as "acknowledgement," or the packet length, or priority information; or may designate that some special response is required of the combination, such as transmitting a test signal. The data block 57 may be very short. In a lighting control network, settings of "off," or dimming to 9%, 5%, 50%, 90%, normal, or 110% may be used, as an example. This can be coded in only three bits.

The check block 58 is the last transmitted in most formats. This may follow any desired error checking or correction routine, and may be more or less than one byte in length.

When the FIG. 6a format is used, the entire route information may be preserved when the packet is retransmitted, or the address of the node doing the retransmitting may be deleted from the list. When the full route is retained to the destination, then the generation of the acknowledgement packet is simplified, because all of its route information already exists. However, this protocol requires that a receiving combination must check the entire route and destination blocks to determine if the packet should be retransmitted, decoded for controlling this control unit, or ignored. If any of the addresses, except the destination, does match that of the receiving combination, then the packet should be retransmitted. When writing the application program, those of ordinary skill will be able to devise other protocols based on use of this packet format, to best fit local needs.

Direct Addressing

Because it reduces packet length and the amount of retransmission, the node logic of FIG. 4 may appear most elegant. After the header or preamble, the ordinary data packet 60 shown in FIG. 6b need only contain the address 55 of the destination node; flags or other control codes contained in the command block 56; the lighting control data in block 57 which may require as little as 3 bits; and error check or correcting block 58. However, it is preferred that the source block 52 is retained in this embodiment. This block can, for example, be used to distinguish between outgoing and acknowledgement packets, and therefore can reduce the number of different logic operations required in the combinations.

Different packets may be of different lengths, usually because of differing lengths of the data field 57. When using the packet of FIG. 6b with the node logic of FIG. 4, to initialize the network the ROM's of each transceiver's microprocessor must be loaded with address tables. Other examples of extraordinary data include error correction algorithms, which may reside in fixed ROM when the control unit is manufactured, or may be loaded later. Thus initialization data may be much longer than routine lighting control data. The packet length may be one of the items coded in the command block 56.

Flooding with Hop Counts

Where the system designer wishes to avoid the requirements imposed by the FIG. 4 logic and FIG. 6b packet on memory and logic capacity required in each combination, due to storage of address tables and the necessity of multiple comparisons during data reception, and the network burden of up-dating these tables whenever substantial changes in signal transmission between nodes is discovered, then a packet format such as the packet 70 of FIG. 6c may be preferable. Blocks 52–58 may be identical to those of FIG. 6b. The particular feature of the FIG. 6c format is block 79, which includes the "kill level" variable. Typically this block is set when a packet is transmitted by the building computer's transceiver T41. It has a value related to the greatest number of hops that transmission along a normal, or slightly longer route, will take. This field value is decremented each time the packet is retransmitted, and is not retransmitted when the received packet has a kill level of, for example, 0. This prevents packets from being circulated endlessly around the network, without any need for complex address or routing schemes.

PaST Format

The Partitioned Spanning Tree format 80 shown in FIG. 6d provides predetermined routing with only simple storage and comparison functions in each node. The sole difference from the packet of FIG. 6b is the address formatting for the source block 82 and the destination block 85. These addresses are arranged in a tree structure, starting from the transceiver T41. The tree arrangement is based on the movement of a packet along successive links, which are the branches of the tree, outward from the transceiver T41. All first level nodes must be in direct communication with the transceiver T41.

The address is shown with respect to the source address 82. Each address is formed by a series of digits each occupying a sub-field 82' within the address field 82. In this embodiment a digit is represented by two bits 84, so that its numerical value can range from 0 to 3. Packets are retransmitted by a node if all but the last digit match this node's address, and this node is not a last level node (which never retransmits).

It will be clear that in all of the above packet descriptions, the values given are merely exemplary. The relative placement of the blocks within the packet has been selected for convenience in processing, and does not form part of the invention. The functions in the command block 56 and the check block 58 can be increased or varied, and neither of these blocks must consist of contiguous bits.

Collision Avoidance

To reduce the overhead burden of complex header and routing instructions, in a medium size office building operation according to the FIG. 5 method is preferable. The building computer will initiate transmission of a packet such as the packet 70 shown in FIG. 6c, and will then wait a predetermined period of time to receive an acknowledgement.

As shown in FIG. 1, transceivers T11, T14 and T24 can be expected to receive this packet simultaneously. As will be described in greater detail below, each transceiver/control combination includes at least one microprocessor (hereinafter referred to as "the microprocessor" even though its total functioning may be divided between two processors), which can decode the received digital information and determine what action, if any, is to be taken. If the message is to all controls, then an appropriate control signal is provided to controls C11, C14 and C24. At the same time, each of the transceivers T11, T14 and T24 will prepare to retransmit the message. The first step in retransmission is to observe a random delay interval, intended to reduce likelihood of collisions. Using a random number generator, the microprocessor of each of these three transceivers produces a delay interval number, for example between 1 and 128 periods. The duration of one delay period is arbitrarily selected, based on the transmitter power-up delay plus the detection response time for the transceivers of this system, but will usually be less than one packet period or a small number of packet periods. During the respective delay intervals, each of the three transceivers will listen to determine if another network transmission is being received, and in the absence of detecting such transmission will commence transmitting after its own randomly generated delay interval.

By coincidence for the system arrangement of FIG. 1, no other transceiver can reliably communicate with more than one of the innermost tier formed by T11, T14 and T24. Therefore after T11's delay interval, T21 will receive the message; after T14's delay, T12 will receive the message; and after T24's delay, T22, T25 and T34 should receive the message. Assuming that there are no collisions, then this process will be continued as the message is relayed, after various delay intervals, radially outward. However, there is significant risk that T22 will be the victim of collision between transmissions from T24 (innermost tier) and T12 (next tier outward) because as drawn neither T24 nor T12 can reliably hear the other. If either T12 or T24 begins transmitting before the other has completed the message, the microprocessor of T22 will determine, through error coding, that corrupted data have been received. T22 will continue to wait for a clean message, and may receive such either from T25 or from T26. Because transmission from T26 would be a fourth tier retransmission, while that from T25 is second tier, likely of collision between them is greatly reduced.

Because the locations of the room lighting controls C11–C35 are often determined primarily for reasons other than RF communication with other transceivers, such as convenient access by people entering or within the room, or historic accident of building wiring, network topography having some of the collision problems, due to differing numbers of links along somewhat parallel paths, will be common. One solution is to provide preferred routing, by increasing the delay for some nodes or providing other logical restrictions that reduce the likelihood of collision. The control programs resident in the microprocessors of the individual transceiver/control combinations can be made more or less responsive to reprogramming by the building computer, to overcome parallel path problems. For example, transceiver T12 could be commanded not to relay any received messages; T13 would then communicate via T26 and T22. Upon communication via that route becoming unreliable, T26 could be disabled temporarily, and T12 enabled for relaying through command from the building computer.

Installation

A feature of the invention is the low cost of installation and set-up. Because a transceiver (including any associated microprocessor) is self-contained and requires no electronic adjustments, it is easily installed by an electrician without special training. The only connections required are input power, and control connections to the control unit. Where justified economically, either the control unit or the transceiver can be a plug-in unit to the other, or they can be integrated. The only extra requirement is that a serial number, bar code number, or other number related to an address or identifying number stored in the transceiver (usually by the manufacturer) be recorded on installation sheets or building drawings for each location.

A preferred embodiment involves a set-up routine which forms part of the application program. It can be fully performed automatically without human intervention unless the result found is that one or more transceivers, on the list of those which were installed, cannot be contacted.

In this method of network set-up, the building computer 40 initiates transmissions of packets directed to those control points (first tier nodes) which can communicate directly with the transceiver associated with the building computer; and then transmits similar packets directed one at a time through each of the first tier nodes to those control points which can communicate with the first tier nodes (therefore called second tier nodes); and so on until at least one communication path has been identified to each of the control points. From this information the building computer calculates routing or retransmission data for each of the control points.

Using the node logic of FIG. 5 and the packet format of FIG. 6c, to start the computer will command transmission of an "all network" address packet having a kill level of 0. This packet will be received by transceivers T11, T14 and T24, these being the only ones within communications range. Each of these will not retransmit the packet because the kill level variable is 0, and will transmit an acknowledgement. Upon receiving these acknowledgements, the applications program will identify these three nodes as first tier, for creation of a network communications diagram like that of FIG. 1.

As a next round, one at a time the computer will direct a packet to the first tier nodes just identified, containing special command or data blocks which cause the addressed node to transmit an "all-network" packet with a kill level variable of zero. Upon receiving acknowledgement signals, these will be retransmitted to transceiver T41, so that the computer can identify the linkages from that first tier node. Similarly, this method can systematically contact every transceiver that is operably linked, so that the communications linkage diagram of FIG. 1 is created by the computer.

If, as an example, there is at this time no relay transceiver T26, and the link from T13 to T23 is too unreliable, then an error message will be generated under control of the application program, that there is no communication with T23. From study of the building diagram of FIG. 2 (which can also be created in the computer, based on installation drawing data which have been entered) building personnel can determine that the problem is due to the isolation of transceiver T23, not a transceiver failure. The addition of relay T26 then becomes an obvious correction.

These data can be used in different ways, depending on the mode of routing selected for use in this network. For example, if normal mode transmission is by flooding, with transmission of a code signal indicative of the number of times a packet is to be retransmitted, the building computer then stores a number associated with each control point address, where that number equals the number of retransmissions which were required to reach the control point via the shortest route; or a greater number if the system operator determines that this will reduce the instances in which packets do not get through following the first transmission from the building computer's transceiver. This method is especially economical if each control point has a unique serial number or bar code (as many as 48 or 50 bits may be used), which can be written onto a building map when the units are installed throughout the building; and which can be used as an initial address when the control point acknowledges receipt of a packet. Subsequently it will often be desirable for the building computer to assign addresses which can be far shorter, for use in routine addressing of packets.

These techniques make it possible to display a 3-D image of the building on a screen, so that for future control purposes a human operator can select control points for lighting optimization according to their location with respect to outside factors such as sun exposure, or groups which are aligned along a wall or floor, without resort to complex lists and drawings.

If route information is normally to be transmitted along with the address in each packet (FIG. 6a), then the building computer stores the shortest route determined for each control point, for transmission if that control point is to be addressed. If address tables for retransmission are stored in each control point, then the computer creates such tables from the route information which was obtained, and subsequently transmits the respective table contents to each control point.

It will also be clear that, with this invention, other automatic set-up techniques are possible under application program control.

Alternatively, a portable computer can be carried through the building to communicate one at a time directly with each of the control points, and determine which other control points this point can send a packet directly to and receive an acknowledgement signal from.

Transceiver/control unit combination

Figure 7:
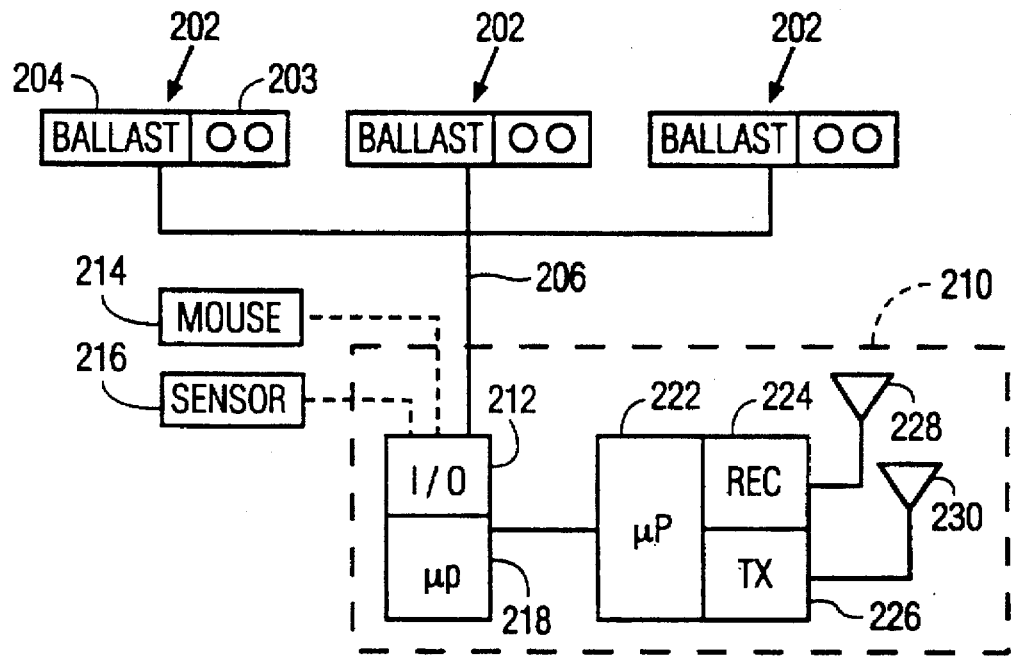
FIG. 7 is a block diagram of the lighting control system in a room of the building of FIG. 2.

It is desirable that the control unit be either a standard unit, or one which is simply modified for easier connection to the associated transceiver. The arrangement shown in FIG. 7 is a preferred arrangement for controlling lights with a room or area having common lighting needs. The room is shown as having 3 luminaires 202 each having one or more fluorescent tubes 203 and a remotely controllable ballast 204. In this embodiment the ballasts are controlled via signals which propagate over the supply conductors from a wall unit 210. The wall unit 210 includes an I/O (input/output) circuit 212 which provides the AC power to the luminaires, and also provides in-room communication and control functions. For example, this room includes a "mouse" 214 which communicates with the I/O circuit by an infra-red link and an occupancy sensor 216 which also communicates with the I/O circuit by another infra-red link. The mouse 214 and the sensor 216 provide control signals which are forwarded to a microprocessor 218 which stores lighting control data or signals, and controls the I/O circuit so that the lights are operated at the times and brightnesses desired (e.g., mouse 214 control) or permitted by the building computer.

Connected to the microprocessor 218 is another microprocessor 222 which is directly associated with the transceiver formed by receiver section 224 and transmitter section 226.

This embodiment shows separate microprocessors 218 for room control and 222 for network communication, and separate antennae 228 and 230 for the receiver and transmitter. However, there is no reason that economy or technical developments may not dictate combining the microprocessors, and the antennae, into one each.

As will be discussed below, the receiver and transmitter sections operate independently of each other, except that the communication protocol preferred for the invention requires that transmission and reception be mutually exclusive. In the preferred embodiment, the frequency of transmission over antenna 230 is independent of the carrier frequency most recently received over antenna 228.

Sliding Frequency

Interference from other signal sources is always a potential problem with radio communications. People in unrelated industries are considering use of bands between 900 and 950 MHz because of commercial development of transceivers for operation in these bands, because of the propagation characteristics of these bands, and because of the possibility of unlicensed operation at low power. As a result it is necessary to devise equipment or techniques which, while inexpensive, will provide sufficiently reliable data transmission for the building system being controlled in the face of unexpected interference.

Applicants believe that, in most cases, interference will come from signal sources which are also narrow band sources. By using frequency-shift-keying modulation, with a frequency shift of ±4 kHz transmission and a 20 Kbit/sec data rate, transmission according to the invention is also a narrow band source. If successive packet transmissions from the transceiver T41 are at different frequencies within the band, then it is unlikely that all will be victims of excessive interference. One technique is to have a preplanned frequency hopping scheme, such as is used for military security, but this requires not only storage of the hopping algorithm or sequence, but also tight synchronization of the network transceivers to a master clock.

Figure 8:
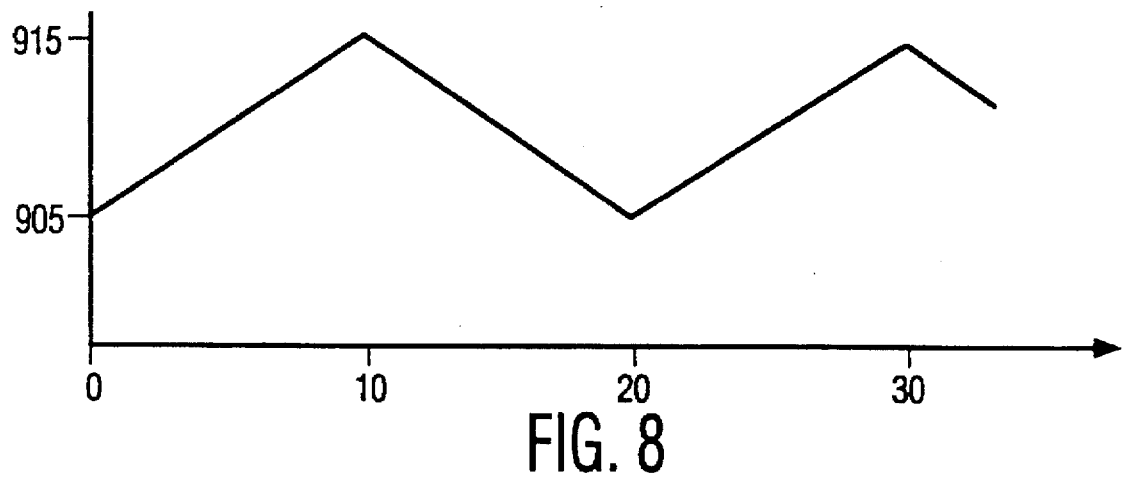
FIG. 8 is a time diagram showing transmitter frequency sliding.
Figure 9:
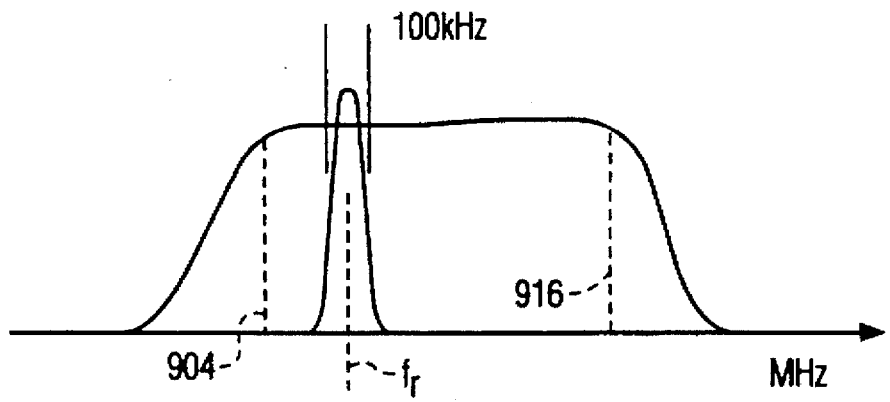
FIG. 9 is diagram showing receiver lock-on, FIGS. 10a and 10b are block diagrams of the transmitter and receiver portions of a transceiver according to the invention, with simple sliding frequency.

According to another aspect of the invention successive transmissions are at carrier frequencies which are shifted by a frequency greater than the bandwidth of the transmitted signal, with a simple smooth variation of the carrier frequency or a stepwise monotonic variation across the selected bandwidth. FIG. 8 shows a preferred triangular waveform variation in which, between one transmission and a next approximately 1.5 sec later, the carrier frequency has shifted 1.5 MHz. This is readily performed by the transmitter 226, shown in slightly greater detail in FIG. 10a than in FIG. 7, in which a VCO 302 receives a sweep input from a frequency sweep control, and binary data input preferably at 20 Kbits/sec. The rate of sweep is selected to keep the carrier frequency change, during one transmission burst, within the receiver bandwidth, but also to maximize the chance that an interference signal which excessively degrades reception of this burst will not affect the next transmission.

The VCO therefor will have a slowly varying frequency when transmitting a carrier burst at the beginning of a packet, and will alternate up and down 4 kHz from the present carrier frequency when being modulated. This signal is amplified in power amplifier 304 and fed through antenna coupler 306 to antenna 230.

This causes the shift during one packet transmission (20 msec duration including a preamble burst) to be less than 20 kHz, well within the 50 kHz preferred bandwidth of the receivers 224 of nodes within communication range, and their AFC circuitry.

If, to reduce costs or to allow a simple sliding frequency, a phase locked loop is not used in the transceiver sections then temperature variations will cause variations of typically 10 PPM/° C. in the VCO frequency. At 900 MHz this amounts only to 900 kHz variation for 100° C. variation between very cold building and cold unit, and hot building with high ambient within the control unit. If aging has an equal effect, temperature and aging effects in the transmitter section will cause up to approximately ±1 MHz variation. To stay within a 10 to 12 MHz pass band of receiver sections, the transmitter range chosen is variation from 905 to 915 MHz. The additional variation due to temperature and aging will, however, be essentially constant during the triangle period of 20 seconds, so that the slope of frequency change will not exceed approximately 1.0 Mhz per sec.

In order to simplify network control problems, it is desirable that the network operate asynchronously, both as to timing of packet transmission but also as to oscillator frequencies. Thus, not only will the transceiver T41 associated with the building computer have a free-running triangular wave control of its transmission frequency, with a period of approximately 20 sec for one full wave cycle, but so also will all other transceivers in the network. Each transmitter will be turned on only when transmission is commanded, and requests for transmission can be made at arbitrary times, so that the exact frequency being transmitted will be unpredictable. The result of this protocol is that the receiver section 224 of each transceiver has no way to predict the frequency of the next data signal to be received, and must be able to search and lock on to a transmission before the first data bit of that transmission.

To permit operation in this mode, each receiver has two operating modes: a capture mode, and a tracking mode. In the capture mode the receiver has a pass band of approximately 10 to 12 MHz, from approximately 904 to 916 MHz. As previously described, a packet commences with an unmodulated carrier burst lasting a sufficient period of time to allow the carrier to be detected, and for the receiver to lock on to that signal and track it in the tracking mode. This is a function of the receiver scanning rate, and the detection and evaluation time. To keep circuitry costs and processing time down, an unmodulated burst of at least 1 msec is desirable, and preferably approximately 12 msec.

In the tracking mode the receiver should have a narrow bandwidth, but no narrower than 100 kHz. This effectively blocks interfering noise or signals outside the narrow pass band, but passes the FSK signal fully. The receiver will incorporate an AFC circuit which is operable to control the local oscillator in the tracking mode, so that the small variation in carrier frequency, if linear sliding is used, can be followed.

Figure 10A:
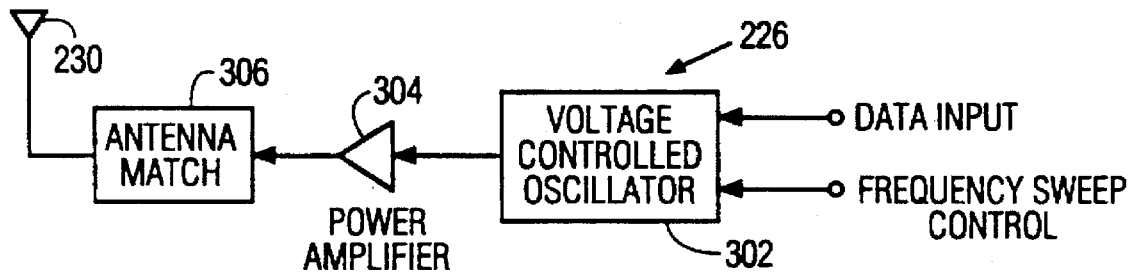
Figure 10B:
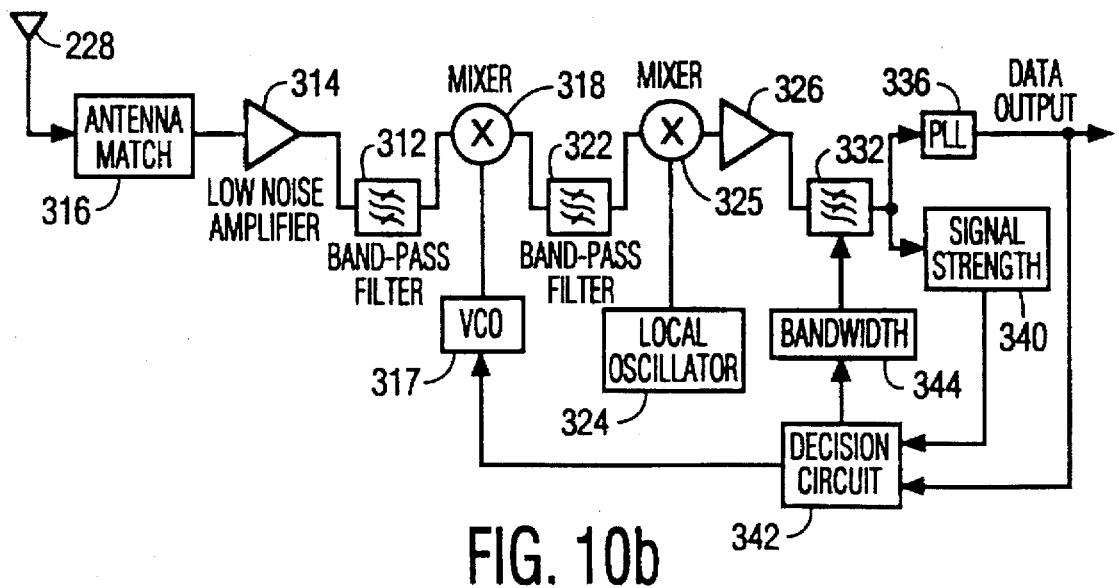

A first embodiment of the receiver section 224 according to the invention, shown by the schematic block diagram in FIG. 10b, includes three sections: one broad band for the capture mode defined by band-pass filter 312, and one narrow band for the tracking mode, defined by IF filter 322, and low pass filter 332. The signal from the antenna 228 is matched to the amplifier 314 by a coupler 316. The output of a VCO 317 is mixed with the output of filter 312 in mixer 318, to provide a first IF signal. This is then mixed with the output of local oscillator 324 in mixer 325 to provide a second IF signal which is amplified in amplifier 326 and filtered in second IF low-pass filter 332. A simple detector 336 provides the detected binary signal from the FSK signal output from filter 332.

To identify the existence of an in-band signal while in the capture mode, a received signal strength indicator 340 also receives the output of filter 332. The output of the received signal strength indicator 340 is provided to a decision circuit 342. The decision circuit has one output which controls the VCO 317, to cause the VCO to stop at the frequency which provides a maximum output from indicator 340. In this embodiment the bandwidth of the lowpass filter 332 is also varied by a bandwidth controller 344, which receives a second output from the decision circuit 342. The filter 332 may be set for a relatively wide bandwidth during capture, and a narrow bandwidth during tracking so that the signal to noise ratio can be improved. The decision circuit 342 also receives the output of the data detector 336 so that it can determine if the signal being received is a network signal, or is an interfering signal. As soon as it is determined that a received signal is interference, sweeping of the VCO is resumed to search for network signals.

To improve the receiver's ability to discriminate against interference signals at a nearby carrier frequency, it is preferable to operate the receiver with a relatively narrow bandwidth at all times. In that circumstance the bandwidth controller 344 is omitted.

In an alternative embodiment a tunable narrow bandpass filter is swept across the band such as 912 to 924 MHZ, to a point at which the signal is received. At that point sweeping is stopped, and the signal is detected.

Avoiding Interfering Signals

Although at the time this invention has been made, there is relatively little traffic in the 900 MHz ISM band, systems according to this invention must be capable of operating without significant modification or maintenance for many years. As a result it should be probable that, despite interference by other signals, and without need for modification, adjustment or reprogramming, the transceivers will actually receive network signals which have been transmitted. Interference can be caused by signals present in one part of the building, but not others; and the interference can be specific signals which are frequently or always present on one channel, or signals occurring sporadically or randomly.

When a transceiver locks on to a signal, and assuming that this occurs during the unmodulated or preamble portion of a transmission, the signal can be identified as a network signal either by the preamble, if any, or by the subsequent modulation and digital information being according to the communication protocol used by the network; for example, the modulation type and bit rate matching one of the examples described in this application, or another one selected for the system. This validation of the signal will probably require between 2 and 5 msec. If, however, the receiver and its microprocessor can more quickly detect the presence of a different modulation, then this received signal can be more quickly identified as spurious, and the transceiver will resume searching for a different signal sooner. By including an additional detector which can detect the presence of "wrong" modulation, skipping can commence in less than one millisecond. This slight increase in cost and complexity of the receiver reduces the chance of missing the beginning of a valid network transmission.

A further technique for interference avoidance, which may be preferred when a plurality of interfering signals are being detected within the band of interest, is prediction. If the receiver oscillators are not highly stable and accurately calibrated, the carrier frequency of an interfering signal cannot be identified accurately so that, as a specific frequency, it is skipped during the next scan of the band. However, it is not necessary that the frequency itself be known. If tunable filters or VCO's in the receiver are swept across the band by a source which is stably repetitive, the time from beginning of the sweep to the frequency corresponding to the interfering signal is easily measured and stored. An "interference frequency" table in the microprocessor then stores a plurality of times which have been identified, on recent sweeps, as corresponding to interfering signals. For the next given number of sweeps the detector output is blanked while the oscillator or filter is passing these frequencies, so that only network signals or new interference signals are detected.

To further improve probability of detection of network signals by a "smart" receiver, in the presence of a number of interfering signals, the technique just described can be enhanced by checking each of the stored times, after a certain number of sweeps, which number may be related to the number of entries in the interference frequency table. Each time that interference is verified as still present at a frequency, the time interval until this frequency is again checked is increased, up to some maximum.

The receiver frequency correlation described above can also be used to allow transmission on one frequency while already receiving another, if desired. According to the preferred operating protocol, a transceiver will not transmit while it is receiving a network signal in the band. As a practical matter, while the transmitter section is transmitting, the receiver section may receive an overpowering signal such that only the center frequency of the strong signal can be determined. However, if the receiver section has sufficient selectivity to receive and demodulate a network signal while the transmitter section is transmitting, then a variation in the control protocol may increase total packet throughput more than it increases collisions. To accomplish this, the transceiver's controlling microprocessor must determine that this transmitter would now transmit on a frequency sufficiently different from that being received, to avoid collision at any other transceiver which is also receiving the same packet as this transceiver. Otherwise it is preferable to delay transmitting from this transceiver while a packet is being received. Such a determination can made without need for accurately calibrated receiver and transmitter sections, while still adhering to a preferred mode in which the transmitter frequency is varied, if an approximate relationship can be determined between (a) the frequency with which this transmitter section would transmit at this time and (b) the frequency that the receiver section is now receiving.

With a transceiver as shown in FIG. 10, this relationship is determined by causing the receiver to track the transmitter frequency while it is transmitting, as described above. For example, the microprocessor correlates the times in the receiver frequency sweep while so tracking, with the times or voltages in the transmitter's triangular or other varying control circuit which are then causing this frequency of transmission, and stores these correlations. When a network signal has been detected and is being received, the microprocessor compares the transmitter control value now being generated, with the value which corresponds to the receiver sweep time for this reception, and determines if the approximate frequency that would now be transmitted is well separated from the network frequency now being received.

PLL Transmitters

The systems described above need not be operated with a linearly sliding frequency, if interference can be otherwise avoided. For example, all transmitters can operate at one frequency, and each receiver can be tuned for that one frequency. This eliminates the possibility of missing a transmission because a receiver's scanning is interrupted while it evaluates signals which turn out to be interference; and it enables the length of a preamble or synchronizing period to be greatly reduced before transmission of the first data bit begins. Intra-system interference due to collisions at individual receivers can be minimized by the use of variable delays between receipt of a packet and re-transmission.

It is also possible to optimize system operation for use with a plurality of predetermined frequencies, so that the overall bandwidth or sweeping range of the receivers can be reduced; or each receiver can be arranged or programmed to scan only all or a selected group of those predetermined frequencies. To operate at a predetermined frequency, or scan on certain predetermined frequencies, typical practice is to use a phase locked loop to stabilize the frequency of a VCO against a reference source, using selected division ratios for the selected frequencies.

The loop settling time is one of the important parameters to be determined when designing a PLL. If different frequencies are to be generated at different times, then rapid settling is usually desired so that the transmitted frequency is substantially constant at the new value shortly after the change in frequency has been commanded. In telecommunication systems using PLL transmitters with FSK modulation, the data modulation rate is usually so high that the time period of the longest allowable series of same value bits is small compared with the response time of the PLL. Therefore the modulation does not affect the center frequency which is being defined by the PLL. However, the system described in this application uses a low bit rate, and may transmit signals having a series of same value bits which is longer than the settling time. In this situation, the transmitter phase locked loop causes the loop control voltage applied to the VCO to change—that is, the carrier frequency drifts from the selected value. This drift causes corruption of the data detected by the receiver, because in the receiver its first oscillator is locked at a frequency which differs from the selected value by exactly the first IF frequency.

In a packet data transmission system according to this aspect of the invention, the transmitter phase locked loop is broken (opened) just before sending the data; that is, after the preamble, and just before or at the instant that modulation begins. Although the transmitter is "drifting" during the data modulation period, this time is short enough that actual drift should be inconsequential. As soon as the data burst has been transmitted, and the transmitter's output amplifier has been turned off, the loop is closed again, so that the oscillator is again stabilized at the selected (or at the next selected) frequency.

Figure 11A:
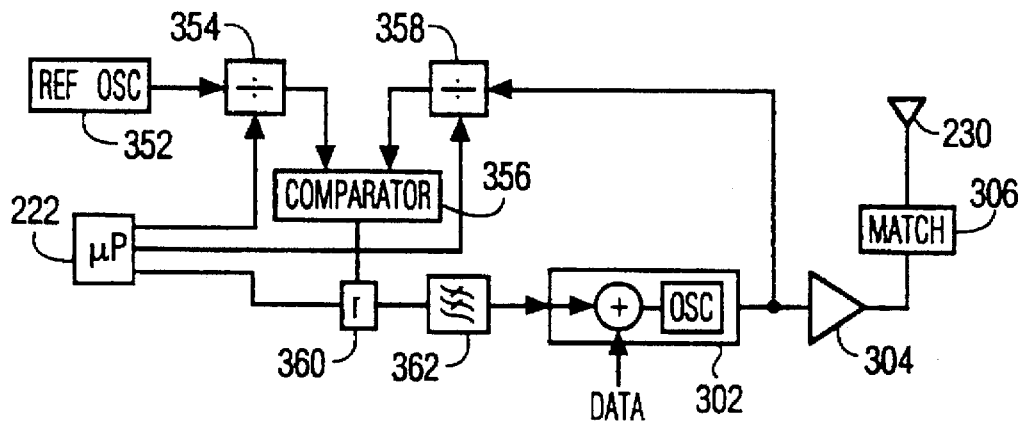
FIGS. 11a and 11b are block diagrams of the transmitter and receiver portions of a second transceiver according to the invention, having a breakable transmitter phase locked loop.

The transmitter shown in FIG. 11a includes components which may be identical to those described with respect to Fig. 10a. The reference portion of the PLL includes a reference oscillator 352 whose output is received by a controllable reference divider 354 whose output in turn is one of two inputs to a phase comparator 356. The output of the VCO 302 is received by a controllable main divider 358 whose output in turn is the other input to the phase comparator 356. The output of the comparator 356 is passed through a switch 360 to a loop filter 362 which may have a settling time of approximately 2 to 3 msec. The loop filter is designed so that, in the absence of a signal input to the filter, its output will remain substantially constant for a time period equal to the longest data burst to be transmitted. The output of the loop filter 362 is one of two inputs to a summer 364 in the VCO, which also receives the binary data signal to be transmitted. The VCO output is amplified in power amplifier 304, and provided to antenna 230.

The reference divider 354, divider 358 and switch 360 are controlled by signals from the transceiver microprocessor, such as the processor 222 shown in FIG. 7. Changing the divider ratios allows selection of different predetermined frequencies. The switch 360 is preferably opened by the microprocessor just before the first data bit to be transmitted, and closed immediatly after completion of the data packet. It will be clear that opening of the switch 360 can be delayed slightly, so long as the change in the control voltage from the loop filter 362 produces an oscillator change which is small compared with the frequency deviation used in the FSK transmission.

Figure 11B:
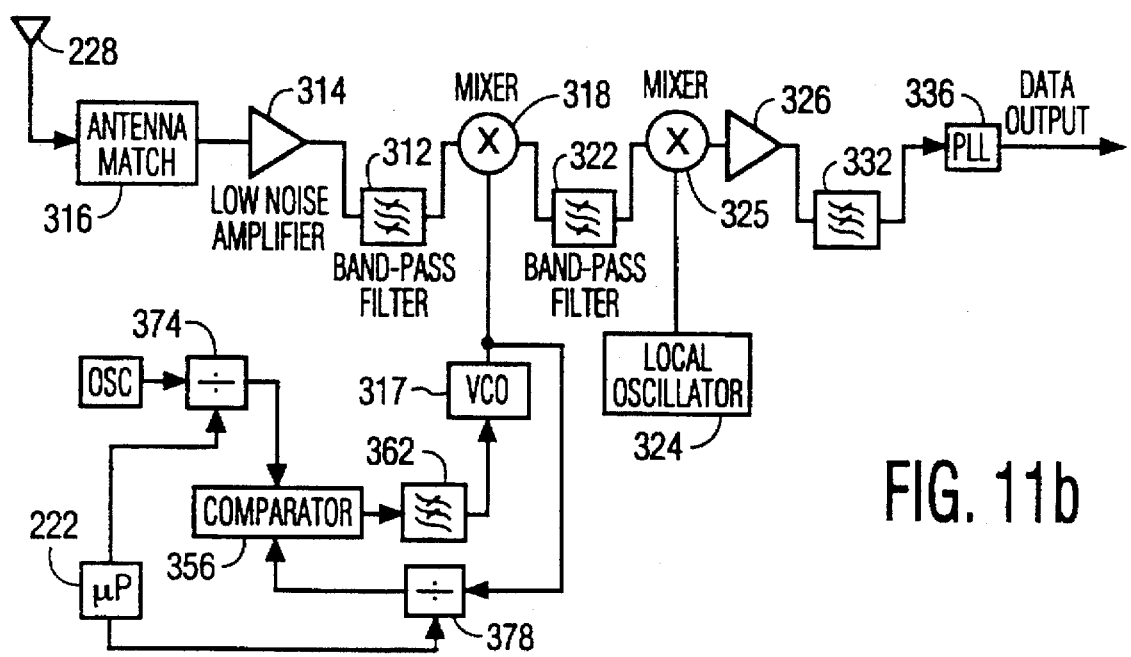

The receiver portion shown in FIG. 11b has a similar PLL control of the VCO 317, through controllable reference divider 374 and main divider 378, which are also controlled by the microprocessor 222, and a comparator 356. The loop filter 362 may be identical to that used in the transmitter portion. Optionally, it may also be economical to use one set of PLL circuits both for transmission and reception, although the VCO frequency will be set differently to provide the IF frequency offset.

If each transmitter transmits only at an assigned frequency, the adjustable dividers in the transmitter PLL can be simpler, fixed dividers; and if the whole system uses one frequency, the receiver dividers likewise need not be adjustable. However, there still may be economy is using one set of PLL circuits for both transmission and reception, in which case the dividers must be adjustable to permit shifting frequency by the amount of the first intermediate frequency.

Other Variations

Many other uses and variations of the invention will suggest themselves to those of ordinary skill. For example, by making the packets larger, they can be used for transmitting much larger bursts of information, such as audio.

The invention is not limited to low bit rate modulation, nor to FSK. These are desirable for a particular lighting control application, but other modulation techniques or rates may be preferred choices for other applications, especially any requiring a higher data transfer rate.

It is not necessary that acknowledgement packets be processed in the same way as outgoing packets. For example, regardless of the format for outgoing packets, it may be desirable to minimize multiple transmission of them. To accomplish this, according to this variation an acknowledgement packet should contain a code identifying it as an acknowledgement, as well as the address of the acknowledging node. Each node is programmed to store the address of the next node along the route to the building computer. Only the acknowledgement code and that "next node" address need be added, when transmitting an acknowledgement of receipt for this node. When received at the "next node" the address will be identified as valid. Because this is an acknowledgement, this "next node" will substitute its stored address for sending acknowledgements, and retransmit. This continues until the building computer is reached.

This technique suffers the disadvantage that some reprogramming is required if one of the links becomes sufficiently unreliable, even though parallel links were available.

Especially after an "all-network" packet has been sent, it is desirable that there not be such a large number of collisions that many acknowledgement signals are lost. Assuming a transmission duration of 10 msec, and a total of 400 control units in a building, it would require 4 seconds for the building computer's transceiver to receive all the acknowledgements if they arrived in a perfectly concatenated string. Thus it may be desirable that, after an "all network" packet is received, each transceiver apply a longer than usual random delay before attempting sending an acknowledgement signal or retransmitting one received from another node. Similarly, the building computer should delay far longer than usual before sending any individually addressed packets to combinations from which an acknowledgement packet has not been received.

If the "building" actually consists of two structures which are spaced sufficiently far apart that direct radio communication from at least one node in one to at least one node in the other is unreliable, then a single building computer can control both by providing a data line from the computer to a transceiver in the remote building. The problem of interfering packets can probably be minimized, however, by considering the two structures as one network. It may even be most economical to link them by placing a relay transceiver on the exterior of one of the buildings, or both, similar to the way that the relay T26 is used in the embodiment of FIGS. 1 and 2.

Many other formats or protocols can be used to avoid effects of interference. There is no requirement for frequency sweeping if one or more channels are available for substantially exclusive use of this network; in that case, all transceivers can operate on a same channel if the transmitter stabilities are adequate. However, this will create the disadvantage of increased collisions. With frequency sweeping by each transceiver, independent of the others, the possibility of collision at a receiver is greatly reduced. Any particular receiver section which has locked on to a first transmission will not usually be affected if another node, within reception distance, commences transmitting on a frequency which is outside the narrow pass band to which the particular receiver has locked.

If interference calls for use of an interference-adaptive receiver as described above, a further improvement in system performance may be attainable if it can be determined that the receiver sections in one region of the building are all experiencing interference at approximately the same one or more periods in their frequency sweep. If, in addition to the normal control signal packets and acknowledgement packets, transceivers can be directed to transmit long term interference patterns to the building computer such that any patterns affecting multiple transceivers can be identified, at some increase in operational and communication complexity the transmitter sections in that region can be directed not to transmit when their frequency sweep is passing that approximate frequency. The usefulness of this technique will be dependent partly on the stability of the transmitter frequency/time sweep relationship over a period of minutes.

In addition to the control functions described, the system is applicable to many situations where the building computer can control many devices which are affected by the same environmental factor or building control decision. For example, remotely controlled sun blinds are effective in some regions, to reduce heating or air conditioning costs. The control units for these blinds can easily be included in the network, at a lower cost than providing a local sensor and stand-alone control system. This is especially true where the operation of one system or set of devices should be taken into account when making control decisions for another system, such as artificial lighting.

Artificial lighting has been described with respect to conventional fluorescent tube luminaires with dimming ballasts. Of course, the invention is not so limited. As dimming techniques may be developed for other light sources, these can equally well be controlled through a network according to the invention.

What is claimed is:

1. A method of controlling at least one parameter at a plurality of device control points within a building, comprising:

transmitting a first radio signal, having a first power level sufficient to be received reliably at at least one of the device control points, and insufficient to be received reliably at all device control points within the building, from a master control point, the first radio signal including a digital control signal relating to said parameter, receiving the first radio signal at one of the device control points, and transmitting a second radio signal, having a second power level sufficient to be received reliably at at least another of the device control points, and insufficient to be received reliably at all device control points within the building, from said one of the device control points, the second radio signal including said digital control signal.

2. A method as claimed in claim 1, characterized in that the control signal relates to all the device control points in the building, further comprising controlling at least a first device from said one of the device control points, in response to receipt of said first radio signal, and controlling at least a second device from said another of the device control points, in response to receipt of said second radio signal.

3. A method as claimed in claim 1, characterized in that the digital control signal relates to said another of the device control points in the building, further comprising controlling at least a first device from said one of the device control points, independent of said first radio signal, and controlling at least a second device from said another of the device control points, in response to receipt of said second radio signal.

4. A method as claimed in claim 1, characterized in that said first and second power levels are the same, and are less than 1 watt, and said first and second radio signals are transmitted with carrier frequencies which are independent of each other and are in a band between approximately 900 and 950 MHz.

5. A method as claimed in claim 1, further comprising:

transmitting said first and second radio signals with carrier frequencies which are independent of each other and are in a band between approximately 900 and 950 MHz, after receiving the first radio signal, testing at said one of the device control point, to determine if a further radio signal in said band is being received, and transmitting said second radio signal only after determination that no radio signal in said band is being received.

6. A method as claimed in claim 1, characterized in that said first radio signal comprises a packet of digital information including said digital control signal, said packet further including a code signal indicative of a maximum number of times the packet should be retransmitted, and prior to transmitting said second radio signal said code signal is decremented and then transmitted as part of said second radio signal with said digital control signal.

7. A method as claimed in claim 1, characterized in that said parameter is a lighting dimming level, said one and said another device control points control first and second luminaires, respectively, said device control points being wall units permitting user control of luminaires in respective rooms, and the digital control signal relates to said another of the device control points in the building, the method further comprising the steps of controlling at least the first luminaire from said one of the device control points, independent of said first radio signal, and controlling at least the second luminaire from said another of the device control points, in response to receipt of said second radio signal.

8. A system for controlling at least one parameter at a plurality of device control units within a building comprising

- a master control unit for generating control signals which are selectively directed to a particular one, or a group, or all of the individual control units, characterized in that the system comprises

- a corresponding plurality of low power radio transceivers connected respectively to associated individual control units to form transceiver/control unit combinations, and a low power radio transceiver connected to the master control unit, where each of the transceivers transmits sufficient power to communicate with at least one other of the transceivers, but not all of them;
- the transceiver connected to the master control unit comprises means for transmitting a packet of information including an address of one of said combinations and a control signal,
- each combination comprises means, responsive to receipt of a packet addressed to said combination, for controlling a respective device according to said control signal, and
- each combination comprises means, responsive to receipt of a packet addressed to another combination, for controlling said respective device independently of said control signal, and for retransmitting said packet.

9. A system as claimed in claim 8, characterized in that each combination includes a first microprocessor associated with the control unit for processing control signals from sensors and user-operated control elements; and a second microprocessor associated with the respective transceiver for controlling retransmission of a received packet, transmission of a device control signal to the first microprocessor, and transmission of an acknowledgement signal by the transceiver.

10. A system as claimed in claim 8, characterized in that it comprises a multiplicity of said combinations,

- at least a plurality of said multiplicity of combinations are substantially identical,
- each packet transmitted by the transceiver connected to the master control unit includes a code signal indicative of a maximum number of times the packet should be retransmitted, and
- each combination comprises means, responsive to receipt of a packet addressed to at least another combination, for decrementing said code signal and then retransmitting the packet including the decremented code signal and said digital control signal.

11. A system as claimed in claim 8, characterized in that each combination comprises a memory for storing a respective table of addresses,

- each combination comprises means, responsive to receipt of a given packet addressed to at least another combination, for comparing the address of said given packet with addresses in said respective table, and retransmitting the given packet only if its address matches one of the addresses stored in said respective table.

12. A system as claimed in claim 8, characterized in that each transceiver transmits at a frequency within a given band, independent of the frequency within that band at which the most recently received packet had been transmitted,

- each combination comprises means, responsive to receipt of a packet which should be retransmitted, for delaying for a randomly determined period of time, and then testing to determine if a further radio signal in said band is being received, and
- transmitting said second radio signal only after determination that no radio signal is being received in said band.

13. A system as claimed in claim 8, characterized in that each of the transceivers is substantially identical, and transmits at a power less than 1 watt within a band between 900 and 950 MHz.

14. A system as claimed in claim 8, characterized in that each of the transceivers is substantially identical, and transmits at a power less than 50 milliwatts within a band between approximately 905 and 928 MHz.

15. A system as claimed in claim 8, characterized in that each respective combination includes a first microprocessor associated with a control unit for luminaires within an area of the building adjoining the respective combination, for processing light dimming control signals from sensors and user-operated control elements; and a second microprocessor associated with the respective transceiver for controlling retransmission of a received packet, transmission of a device control signal to the first microprocessor, and transmission of an acknowledgement signal by the transceiver.

16. A system as claimed in claim 8, characterized in that said control signals include lighting dimming signals,

- the system comprises a multiplicity of said combinations arranged for controlling luminaires within areas of the building adjoining the respective combinations,
- at least a plurality of said multiplicity of combinations are substantially identical,
- each packet transmitted by the transceiver connected to the master control unit includes a code signal indicative of a maximum number of times the packet should be retransmitted, and
- each combination comprises means, responsive to receipt of a packet addressed to at least another combination, for decrementing said code signal and then retransmitting the packet including the decremented code signal and said digital control signal.

17. A system as claimed in claim 8, characterized in that each respective combination includes a microprocessor associated with a lighting control unit for luminaires within an area of the building adjoining the respective combination, for processing light dimming control signals from at least a user-operated control element,

- each transceiver transmits at a frequency within a given band, independent of the frequency within that band at which the most recently received packet had been transmitted,
- each combination comprises means, responsive to receipt of a packet which should be retransmitted, for delaying for a randomly determined period of time, and then testing to determine if a further radio signal in said band is being received, and
- transmitting said second radio signal only after determination that no radio signal is being received in said band.

18. A system as claimed in claim 17, characterized in that each of the combinations is substantially identical, and transmits at a power less than 1 watt within a band between 900 and 950 MHz.

19. A system as claimed in claim 17, characterized in that each of the transceivers is substantially identical, and transmits at a power less than 50 milliwatts within a band between approximately 905 and 928 Mhz.

20. A method for managing a building network control system, the method comprising executing the following steps in a network, the network comprising a master node and at least first and second non-master nodes within a building:

from the master node, wirelessly transmitting digital control information to the first non-master node at a power which is sufficient to reach the first non-master node, but insufficient to reach the second non-master node;

from the first non-master node, wirelessly repeating the digital control information at a power sufficient to reach the second non-master node; and receiving the digital control information at the second non-master node, so that the second non-master node can respond to the control information.

21. The method of claim 20 wherein the non-master nodes are device control points in the building.

22. The method of claim 21 further comprising the step of, in response to the digital information, in each of the first and second non-master nodes, effecting respective analogous device control actions in respective associated first and second devices.

23. The method of claim 21 wherein the device control points are for controlling building lighting.

24. A device control point for use in a building control network the device control point including:

transceiver means suitable for receiving and transmitting wireless communication of control information either from and to other similar device control points; and/or from and to a master node;

means, responsive to said control information, for controlling an associated device when said control information specifies control of the associated device; and causing the transceiver to repeat said control information when said control information specifies control of a device not associated with the device control point.

* * * * *